(12) United States Patent
Smith et al.

(10) Patent No.: US 12,099,527 B1
(45) Date of Patent: Sep. 24, 2024

(54) METHOD AND AN APPARATUS FOR META-MODEL OPTIMIZATION OF AN ENGAGEMENT PORTFOLIO

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/415,131

(22) Filed: Jan. 17, 2024

(51) Int. Cl.
    *G06F 16/28*     (2019.01)
    *G06F 16/2457*     (2019.01)

(52) U.S. Cl.
    CPC ...... *G06F 16/285* (2019.01); *G06F 16/24578* (2019.01); *G06F 16/288* (2019.01)

(58) Field of Classification Search
    CPC ........ G06F 40/30; G06F 18/23; G06F 16/906; G06F 30/27; G06F 16/9535; G06F 16/337; G06F 16/285; G06F 16/24578; G06F 16/288; G06Q 10/06; G06Q 10/06398; G06Q 50/22; G06Q 10/0639; G06Q 10/101; G06N 20/00; G06N 5/022
See application file for complete search history.

(56) References Cited

U.S. PATENT DOCUMENTS

| | | | |
|---|---|---|---|
| 10,909,469 | B2 | 2/2021 | Drakoulis |
| 11,068,826 | B2 * | 7/2021 | Rajan ............... G06Q 10/06393 |
| 2018/0218309 | A1 | 8/2018 | Keen |
| 2020/0356955 | A1 | 11/2020 | Graziano |
| 2021/0342963 | A1 * | 11/2021 | Rudden .................... G06N 3/04 |
| 2022/0114532 | A1 * | 4/2022 | Virnoche ....... G06Q 10/063112 |
| 2022/0245557 | A1 | 8/2022 | Minter |
| 2023/0058835 | A1 | 2/2023 | Ahluwalia |

* cited by examiner

*Primary Examiner* — Hau H Hoang
(74) *Attorney, Agent, or Firm* — Caldwell Intellectual Property Law

(57) ABSTRACT

A method for meta-model optimization may include receiving an entity and engagement profile, classify each entity and engagement profile to one or more descriptors, compiling a digital model for each entity and engagement profile, identifying an optimal compatibility allocation of entities to engagements; and generating a user display summarizing the optimal meta-model to the user.

20 Claims, 6 Drawing Sheets

METHOD AND AN APPARATUS FOR META-MODEL OPTIMIZATION OF AN ENGAGEMENT PORTFOLIO

FIELD OF THE INVENTION

The present invention generally relates to the field of artificial intelligence. In particular, the present invention is directed to a method and an apparatus for quantifying and optimizing collaborative entity engagements.

BACKGROUND

Current systems and methods to maximize collaborative engagements are limited to superficial assessments of key attributes, or prioritization of an essential entity then assembling the remaining composition to fill the subordinate needs. While these current systems and methods are marginally capable of achieving their assigned objectives, they lack the honed analysis necessary to efficiently engage the available resources and skillsets to optimally reach each engagement's intended purpose.

SUMMARY OF THE DISCLOSURE

In an aspect an apparatus for meta-model optimization is provided. The apparatus includes a computing device configured to receive a plurality of entity profile data and engagement profile data, classify each entity and engagement profile to a plurality of descriptors, compile a digital model for each entity and engagement profile, identify an optimal compatibility allocation of entities to engagements, and generate a user display summarizing the optimal meta-model to the user.

In another aspect, a method for meta-model optimization is provided. The method includes receiving, by a computing device, an entity and engagement profile, correlating, by the computing device, each entity and engagement profile to a plurality of descriptors, compiling, by the computing device, a digital model for each entity and engagement profile, identifying, by the computing device, an optimal compatibility allocation of entities to engagements, and generating, by the computing device, a user display summarizing the optimal meta-model to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to meta-model optimization of multiple isolated models. In an embodiment, apparatus and methods may include utilizing machine-learning to generate optimized alternative options for achieving each engagement's intended purpose. Further, the meta-model optimization may then assess the collective entirety of the user engagement portfolio to optimize an entire fleet of entities as balanced against all current engagements.

Aspects of the present disclosure can be used to digitally capture an entity's collaboration synopsis. As used in the current disclosure, an "entity" is comprised of one or more persons, a single piece of equipment or discernible system of aligned pieces of equipment, or any other device capable of executing a role or function. An entity may include a corporation, organization, business, group one or more persons, and the like. Aspects of the present disclosure can also be used to digitally condense an engagement's task characteristics.

Figure 1:
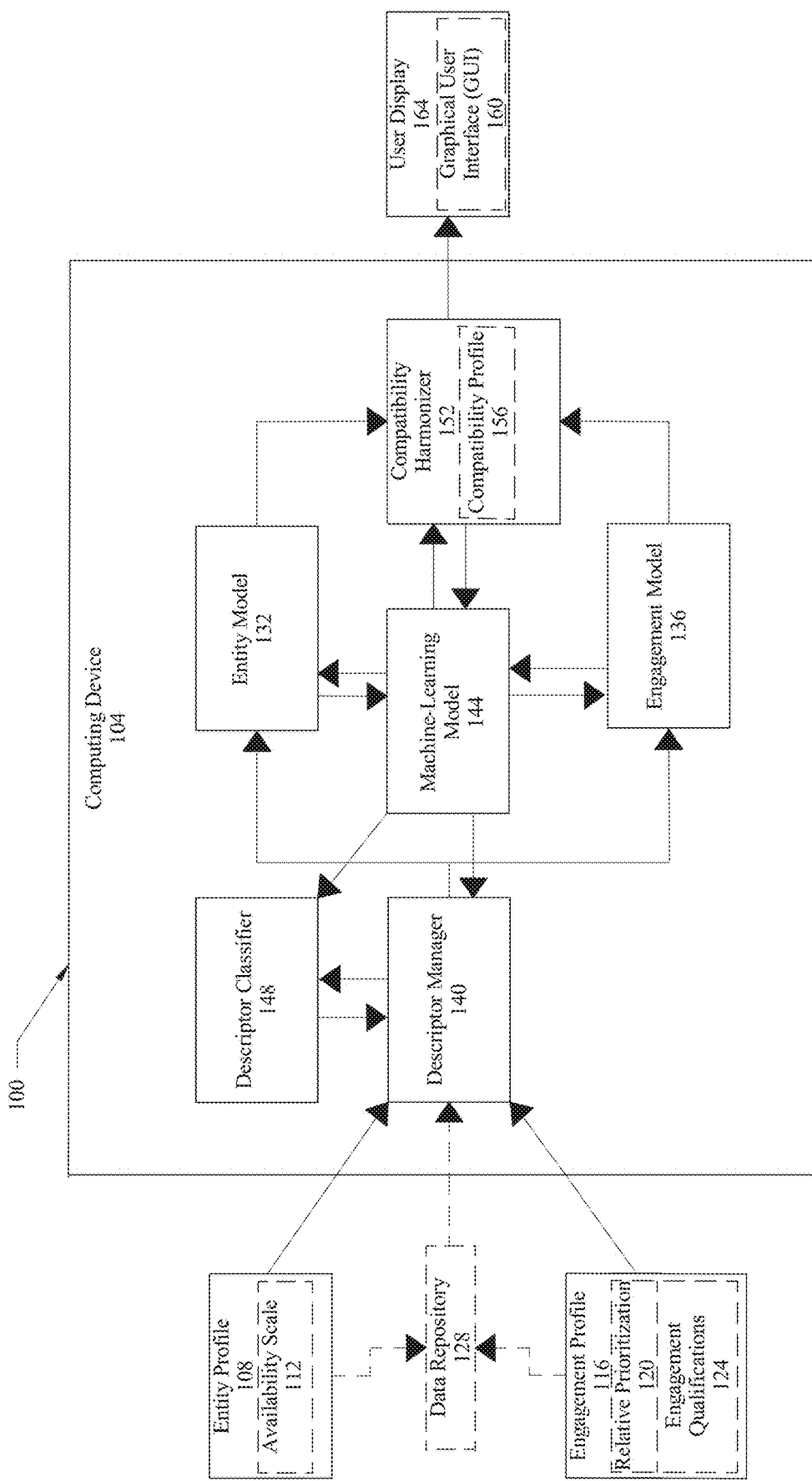
FIG. 1 is a block diagram of an exemplary embodiment of an apparatus for meta-model optimization.

Referring now to FIG. 1, an exemplary embodiment of an apparatus 100 for meta-model optimization is illustrated. Apparatus may include a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more apparatus operating in concert, in parallel, sequentially or the like; two or more apparatus s may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may receive an entity profile 108. As used in this disclosure, "entity profile" is a grouping of data relating to an entity's abilities which contains basic entity information as well as data relating to an entity's talents and abilities. As a non-limiting embodiment, entity profile may include unique ability data such as, and without limitation, entity's unique talents (e.g. can memorize large amounts of information, is a sociable person, great problem solver, can resolve disputes quickly, excellent customer service, etc.). Entity profile 108 may include an entity's passions (e.g. film, exercise, family, charitable donations, nonprofit work, etc.), goals (e.g., career goals, personal lifestyle goals, etc.), hobbies, strengths, weaknesses, previous education and any affiliated certifications (e.g. Six Sigma, Agile Scrum Master, government issued security clearance, etc.), likes (e.g. foods, various tasks, music genres, etc.), dislikes, professional ability (can work long hours, can draft legal motions, can file taxes, event planning, supervisory needs, trained electrical engineer, bar certified attorney, mechanic, financial advisor, etc.), preferences (e.g. introvert vs. extravert, morning vs night owl, active or sedentary work life, 6-day work week vs 5 day with extended hours, etc.), operational cost (e.g. hourly pay rate, pro-rated compensation package cost, mandatory training required, any other entity-specific costs). Entity profile 108 may further include an entity's historical assessments (e.g. employment evaluations, peer ratings, references, etc.). Entity profile 108 may additionally include an entity interoperability assessment (e.g. Kolbe A Index, Myers Briggs Type Indicator, Birkman Method, or any proprietary or industry standard personality test). Entity profile 108 may further include an availability scale 112. As used in this disclosure, "availability scale" is a numerical rating of an entity's current obligation priority combined with that specific entity's relative importance to the obligation. As a non-limiting embodiment, availability scale may be used to assess the entity's current obligation priority as compared to any other potential obligation that has or may arise (e.g. 10 for entities engaged in the most important, pressing work that the user oversees, or 3 for entities actively engaged in lower priority activities and available to be redirected to higher priority activities if needed).

With continued reference to FIG. 1, apparatus 100 may receive an engagement profile 116. As used in this disclosure, "engagement profile" is a grouping of data relating to an engagement's needs, intended purpose, and operational characteristics which contains basic engagement information capturing the entity-related details necessary to affect a proper entity allocation. As a non-limiting embodiment, engagement profile 116 may include unique functional attributes such as, and without limitation, an engagement's work needs broken down by skillset and capacities (e.g. a missile design engagement requiring 4,000 person-hours of aerospace engineering skills, 1,000 person-hours of thermodynamic analysis, and 20,000 person-hours of software engineering). Engagement profile 116 may include an engagement's relative prioritization 120. As used in this disclosure, "relative prioritization" is a numerical rating of an engagement's priority relative to all other engagements within the user's purview. As a non-limiting embodiment, relative prioritization may be used to assess the current engagement's priority as compared to all other engagements (e.g. 10 for the most important engagement with the most pressing timeline, 3 for a moderately important project with no immediate need for completion, etc.). Engagement profile 116 may include specific qualifications 124. As used in this disclosure, "specific qualifications" is a set of required attributes that some or all entities to be allocated to the engagement must possess prior to allocation. As a non-limiting embodiment, specific qualifications 124 may include an engagement's specific entity criteria as it pertains to all allocated entities, or a distinguishable subset of entities within the engagement (e.g. a top secret security clearance, geographic location, laboratory access, certain language proficiency, etc.). Engagement profile 116 may additionally include scheduled completion date, pre-assigned personnel, or any other features that may be used to support the optimal cluster pairing of entities with engagements.

With continued reference to FIG. 1, in some embodiments, entity profile 108 and engagement profile 116 may be received through an input device, which may be remotely located and may include a computer, laptop, smart phone, or tablet. In instances where entity profile 108 or engagement profile 116 is input into a remote input device, entity profile 108 and engagement profile 116 may be transmitted across a wired or wireless connection. In some embodiments, the wireless connection may be any suitable connection (e.g., radio, cellular, etc.). In some instances, entity profile 108 or engagement profile 116 may be stored in a data repository 128. Data repository 128 may be accessed by any input device, wherein authorization credentials may be required. In some instances, entity profile 108 or engagement profile 116 may be created and stored via a laptop and accessed from tablet, using authorization credentials.

Still referring to FIG. 1, an exemplary embodiment of determining cluster pairs is described. For the purposes of this disclosure a "cluster pair" is a coupling of two or more sets of information. Cluster pairs may include pairs of information that are correlated and/or associated with one another. In some cases, cluster pairs may include sets of information that are complementary to one another. More specifically, but as a nonlimiting embodiment, cluster pairing may be used to assign entity models 132 to engagement models 136 based on complementary profile sets. In a non-limiting example, the cluster pairing process may be the same or substantially the same as the cluster pairs described in U.S. patent application Ser. No. 18/403,980 (1452-040USU1), filed on Jan. 4, 2024, titled "APPARATUS AND METHOD FOR DETERMINING CLUSTER PAIRS," which is incorporated by reference herein in its entirety. In a separate non-limiting example, specific references to training data or machine learning model within this disclosure may be substantially similar to those described within U.S. patent application Ser. No. 18/409,687 (1452-047USU1), filed on Jan. 10, 2024, titled "SYSTEMS AND METHODS FOR MACHINE LEARNING MODEL GENERATION".

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm to produce outputs given data provided as inputs; this is in contrast to a non-machine-learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 may include a memory communicatively connected to a processor. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals communicated may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital or analog communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, computing device 104 is configured to receive a plurality of entity profiles 108 and engagement profiles 116. Computing device 104 is configured to then classify both entity profile 108 and engagement profile 116 to a plurality of descriptors. "Descriptor," as used in this disclosure, is a computer-generated attribute to identify and/or categorize user data for more efficient use within computing device 104. For example, descriptor manager 140 may be used to identify elements of entity profile 108 or engagement profile 116 that may be relevant to the current cluster pairing, or future pairing of entities to engagements. Descriptor manager 140 applies data tags to each set of profile information to organize and summarize the profile information based on key word identification, thereby converting the raw user data into machine-readable format. In a non-limiting embodiment, descriptor manager 140 may apply labels such as "creator" for an entity profile with indications that the entity excels at innovating and generating new ideas, "implementer" for an entity profile indicating the entity excels at executing innovative ideas, or "repeater" for entity profiles encapsulating a heightened ability to execute similar or recurring tasks persistently. In some cases, each element with the entity profile 108 or engagement profile 116 may be classified to a plurality of descriptors. In some cases, descriptors may be applied to aggregated groupings of profile elements. In a nonlimiting embodiment, user may have a common history of needing entities with both laboratory certifications and data analysis experience to support a research project. In that embodiment, a machine-learning model 144 may aggregate those two attributes to represent a "lab researcher" to simplify subsequent cluster pairing evolutions. "Machine-learning model" is described in detail below.

With continued reference to FIG. 1, a "descriptor classifier," as used in this disclosure is a machine-learning executed model, such as a mathematical model, neural net, or program generated by a machine-learning algorithm known as a "classification algorithm," as described in further detail below, that sorts inputs and the initial set of descriptors into categories or bins of data. Descriptor classifier 148 may be configured to output a plurality of labels or otherwise identifies a set of data that are clustered together. In some cases, machine-learning model 144 may generate and train descriptor classifier 148 to efficiently categorize the descriptor manager 140 assigned descriptors to prioritize the unique or important aspects of the profiles. Training data may include express user feedback through a graphical user interface, wherein user selects the descriptor classifier reasoning, or single descriptor, or some other methodology and either annotates as proper or improper, thereby promoting or suppressing the correlation, respectively. Machine-learning processes, as applicable within this disclosure, are described below. In some cases, descriptor classifier 148 may use data to prioritize and weight the allocated descriptors based on prior user needs and preferences. In some cases, descriptor classifier 148 may select any elements within descriptor manager 140, or directly within entity profile 108 or engagement profile 116 containing similar characteristics and group them together. In some cases, classifier machine-learning model may be trained using inputs and outputs based on previous iterations.

Continuing to refer to FIG. 1, computing device 104 generates an entity model 132 for every entity profile 108 received by descriptor manager 140. Entity model 132 is a digital replica of entity profile 108, but wholly exists in machine-readable format to optimize the cluster pairing process. Similarly, computing device 104 generates an engagement model 136 for every engagement profile 116 received by descriptor manager 140, which is a digital replica of the engagement profile 116 in machine-readable format. Descriptor manager 140 converts the input profiles to machine-readable format through its data tagging descriptor process described above. As machine-learning model 144 continues to revise its categorization algorithms and implement those revisions within both descriptor manager 140 and descriptor classifier 148, descriptor manager 140 will update both entity model 132 and engagement model 136. Descriptor classifier 148 may be trained with training data correlating entity profile 108 or engagement profile 116 to descriptor groupings such as creator, implementor, repeater, or any other relevant grouping mechanism. Training data may include a plurality of profiles classified to a plurality of descriptors, wherein the correlation is validated or invalidated either by machine-learning model 144 or direct user feedback. Correlations may indicate causative and/or predictive links between data, which may be modeled as relationships, such as mathematical relationships, by machine-learning models, as described in further detail below. This process relies on machine-learning training data discussed in depth below. In a non-limiting embodiment, training data may be formatted and/or organized by categories of data elements by, for example, associating data elements with a plurality of descriptors corresponding to categories of data elements. As a non-limiting example, training data may include data entered in standardized forms by persons or processes, such that entry of a given data element in a given field in a form may be mapped to a plurality of descriptors or descriptor categories. Elements in training data may be linked to categories by tags, tokens, or other data elements. In a non-limiting embodiment, training data may be generated by user validating the descriptor allocations retroactively, or conversely overturning improper descriptor allocations. Machine-learning model 144 may then revise its internal algorithms to account for the user feedback and improve subsequent descriptor allocations. Both entity model 132 and engagement model 136 are subsequently directed to a compatibility harmonizer 152 for the cluster pairing process.

Still referring to FIG. 1, apparatus 100 may include a data repository 128. Data repository 128 may be implemented, without limitation, as a relational database, a key-value retrieval database such as a NOSQL database, or any other format or structure such that a person skilled in the art would recognize as suitable upon review of the entirety of this disclosure. Data repository 128 may alternatively or additionally be implemented using a distributed data storage protocol and/or data structure, such as a distributed hash table or the like. Data repository 128 may include a plurality of data entries and/or profiles as described above. Entity profiles 108 and engagement profiles 116 in data repository 128 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data repository 128 may store, retrieve, organize, and optimize the use of entity profiles 108 and engagement profiles 116.

With continued reference to FIG. 1, compatibility harmonizer 152 is configured to evaluate a complementary cluster pair as a function of the relative match between entity profile 108 and engagement profile 116. A "complementary cluster pair" for the purposes of this disclosure is a pairing of a plurality of entity profile 108 with engagement profile 116 wherein the optimal match is based on both the direct compatibility between the two profiles, and the prioritization of allocations across the user's entire engagement portfolio. For example, in a non-limiting embodiment, a specific instance of entity profile 108 may expressly contain every single qualification listed in a specific instance of engagement profile 116, which would normally identify a highly successful cluster pair to recommend to user. But in the case where the specific instance of entity profile 108 contains a very restrictive availability scale 112, indicating the entity is currently occupied by a very high priority engagement profile 116, compatibility harmonizer 152 would recommend the referenced entity profile 108 remains associated with its current engagement profile 116. Conversely, in a separate non-limiting embodiment, a specific instance of entity profile 108 may be proposed as a cluster pair with a specific instance of engagement profile 116, despite having little to no common descriptors or compatibility. Nonetheless, based on the specific instance of engagement profile 116 having a high relative prioritization 120 and the specific instance of entity profile 108 having a high availability scale 112, compatibility harmonizer 152 may propose the pairing. Continuing, in some cases, compatibility harmonizer 152 may contain a compatibility profile 156. Compatibility profile 156 generates a success rate for the cluster pairing of a specific entity profile 108 with a specific engagement profile 116. In a non-limiting embodiment, compatibility profile 156 initially generates a match likelihood percentage based on the assessed commonality of the two profiles and their descriptor(s) (e.g. every single descriptor matching perfectly between the two profiles would generate a 100% compatibility profile 156, and no matching descriptors would generate a 0%). Compatibility profile 156 relies on machine-learning model 144 to continually revise and improve its algorithm to effectively incorporate training data contributed by user.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations, descriptors, or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified entity and engagement data and output a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related entity data or engagement data, which may be provided with user cohort labels; this may, for instance, generate an initial set of user cohort labels from an initial set of user entity or engagement data of a large number of users, and may also, upon subsequent iterations, identify new clusters to be provided new user cohort labels, to which additional user physiological data may be classified, or to which previously used entity or engagement data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{ci \exists C}$ $dist(ci, x)^2$, where argmin includes argument of the minimum, ci includes a collection of centroids in a set C, and dist includes standard Euclidean distance. K-means clustering module may then recompute centroids by taking a mean of all cluster data entries assigned to a centroid's cluster. This may be calculated based on $ci=1/|Si|\Sigma xi \exists Si^{vt}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected data set. Degree of similarity index value may indicate how close a particular combination of attributes, availabilities, qualifications, or priorities is to being classified by k-means algorithm to a particular cluster. K-means clustering algorithm may evaluate the distances of the combination of attributes, availabilities, qualifications, or priorities to the k-number of clusters output by k-means clustering algorithm. Short distances between a set of entity and engagement data and a cluster may indicate a higher degree of similarity between the set of entity and engagement data and a particular cluster. Longer distances between a set of physiological behaviors and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an entity or engagement data set and the data entry cluster. Alternatively or additionally k-means clustering algorithm may select a plurality of clusters having low degree of similarity index values to entity or engagement data sets, indicative of greater degrees of similarity. Degree of similarity index values may be compared to a threshold number indicating a minimal degree of relatedness suitable for inclusion of a set of entity data with engagement data, or vice versa, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, in some cases computing device 104 may determine compatibility profile 156 by receiving a plurality of complementary entity model 132 and engagement model 136 from data repository 128 and using the pair as training data. With machine-learning model 144 being most accurate and effective when it has an extensive historic database to learn from, user may generate hypothetical profiles that user intends to be good examples of a successful match. User may then, through a graphical user interface (GUI) 160, inject feedback promoting the match. These types of interactions, especially when aggregated in large quantities, teach machine-learning model 144 profile cluster pairs should receive high compatibility profile 156 ratings, and machine-learning model 144 adjusts accordingly.

With continued reference to FIG. 1, computing device 104 may further be configured to create a user display 164. As used in this disclosure, "user display" is a data structure representing a specialized formatting of data on a computer configured such that the information can be effectively presented for a human user interface. In some cases, user interface data structure 164 includes entity profile 108 and/or engagement profile 116. In some cases, user display 164 may include any data described in this disclosure.

Computing device 104 may be configured to transmit the user display 164. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Computing device 104 may transmit the data described above to data repository 128 wherein the data may be accessed from data repository 128, or computing device 104 may further transmit the data described above to any other computing device or user display capable of receiving and displaying the information. "Display" for the purposes of this disclosure is a device configured to show visual information. In some cases, user display 164 may include a liquid crystal display (LCD), a cathode ray tube (CRT), a plasma display, a light emitting diode (LED) display, or any combinations thereof. User display 164 may include a display device. Display device may include, but is not limited to, a smartphone, tablet, laptop, monitor, tablet, and the like. Display device may include a separate device that includes a transparent screen configured to display computer generated images and/or information.

With continued reference to FIG. 1, GUI 160 may be configured in various forms to maximize user engagement experience. For the purposes of this disclosure, a "graphical user interface" is a means to allow users to interact with electronic devices through visual representations. For example, user may interact with a computer system through the use of input devices and software wherein user interface may be configured to facilitate the interaction between the user and the computer system. A user interface may include GUI 160, command line interface (CLI), menu-driven user interface, touch user interface, voice user interface (VUI), form-based user interface, any combination thereof and the like. In some embodiments, a user may interact with the user interface using computing device distinct from and communicatively connected to computing device 104. For example, a smart phone, smart tablet, or laptop operated by the user and/or participant. GUI 160 may include one or more graphical locator and/or cursor facilities allowing a user to interact with graphical models and/or combinations thereof, for instance using a touchscreen, touchpad, mouse, keyboard, and/or other manual data entry device. In some embodiments, GUI 160 may include icons, menus, other visual indicators or representations (graphics), audio indicators such as primary notation, and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a GUI 160. Persons skilled in the art, upon reviewing the entirety of this disclosure, will be aware of various ways in which GUI 160 and/or elements thereof may be implemented and/or used as described in this disclosure. In some cases, user display 164 may be configured to present GUI 160 to user, wherein user may interact with GUI 160. In some cases, user may view GUI 160 through user display 164.

With continued reference to FIG. 1, user display 164 may be configured to display multiple entity profiles 108 or engagement profiles 116. In some cases, user display 164 may be configured to display data as 'clickable elements' through the use of GUI 160 wherein user may select a particular element and view any data that may be associated. In a non-limiting embodiment, user display 164 may display multiple entity profiles 108 as a clickable element wherein selection of a particular profile may signal to computing device 104 to display the corresponding data associated with the profile.

With continued reference to FIG. 1, machine-learning model 144 may conduct meta-model optimization. For the purposes of this disclosure, a "meta-model optimization" is the analysis, construction and development of the frames, rules, constraints, models and theories applicable and useful for modeling a predefined class of problems. In a non-limiting embodiment, machine-learning model 144 constructs the rules, constraints, and theories applicable to the cluster pairing process of matching entity profile 108 to engagement profile 116. The cluster pairing process includes the management and refinement of descriptor manager 140 to apply the descriptors to profiles, descriptor classifier 148 to recognize and categorize affiliated descriptors, and both entity model 132 and engagement model 136 to optimally capture user inputs and descriptions. Machine-learning model 144 then evaluates all entity models 132 and engagement models 136 to optimize user's engagement portfolio such that all available entities are maximally engaged and efficiently contributing to the most effective engagement culmination, as defined by user. Machine-learning model 144 and the process to learn and refine each individual model is described in detail below.

With continued reference to FIG. 1, optimization of user's entire engagement portfolio may be based on prioritization or ranking criteria establishing either an engagement as the highest priority, or a strategy (e.g. cost efficiency, time-saving, quality, etc.) as the top priority, wherein machine-learning model 144 would then automatedly prioritize all engagements on equal footing, but optimizing the overall cost-efficiency, time-saving, or quality of the combined engagements, as directed by user. Machine-learning model 144 may rely on user feedback through GUI 160 to train machine-learning model's 144 prioritization methodologies.

Figure 2:
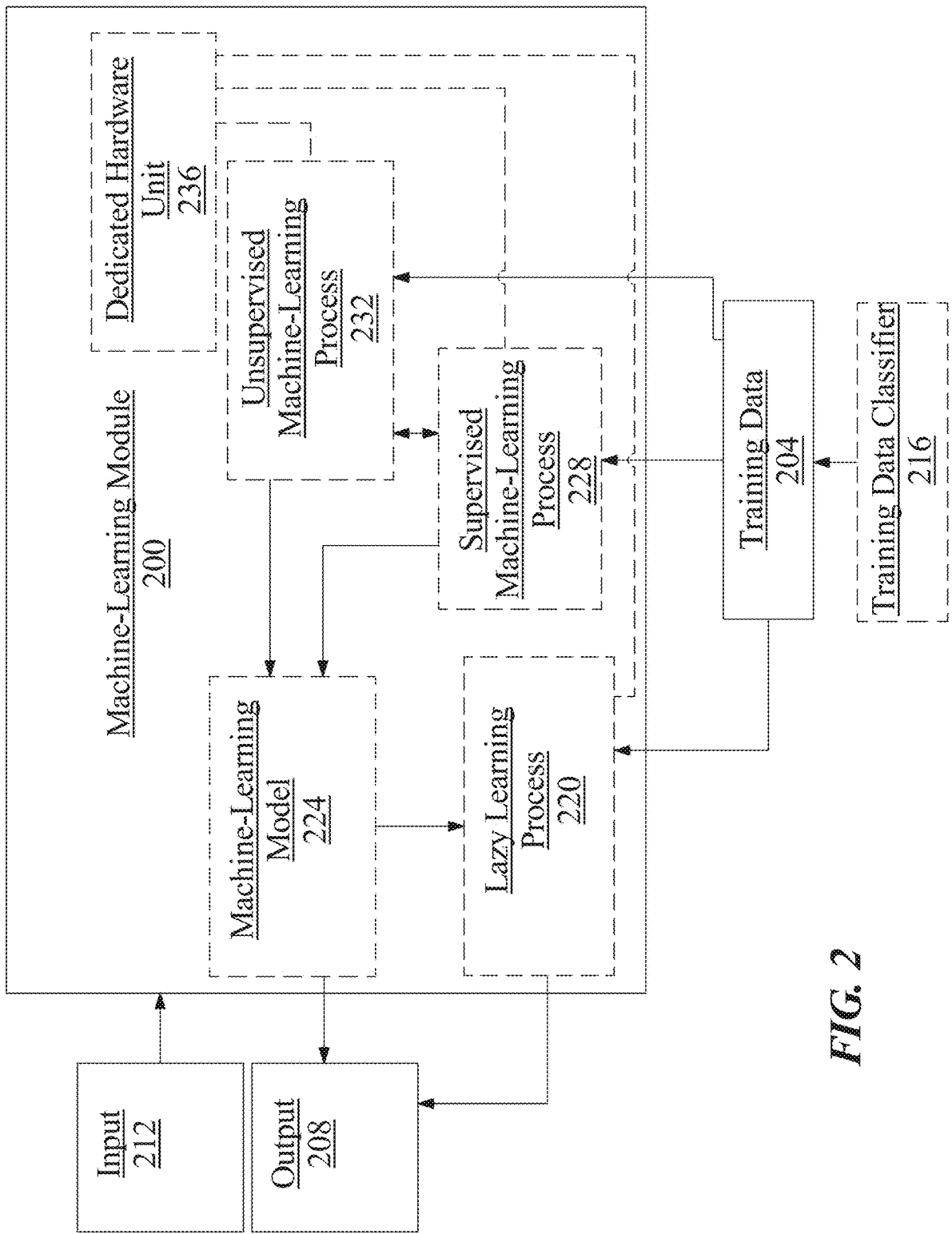
FIG. 2 is a block diagram of an exemplary machine-learning process.

Referring now to FIG. 2, an exemplary embodiment of a machine-learning module 200 that may perform machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine-learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with a plurality of descriptors corresponding to categories of data elements. As a non-limiting example, training data 204 may include data entered in standardized forms by persons or processes, such that entry of a given data element in a given field in a form may be mapped to a plurality of descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative training data 204 may include previous successful cluster pairs of entity models with an engagement model as identified by user. As a separate non-limiting embodiment, training data 204 may include descriptor classifier groupings that have not been used or applied for extended periods sufficient to assess that the grouping is not applicable for user's intents and purposes.

Further referring to FIG. 2, training data may be filtered, sorted, and/or selected using one or more supervised and/or unsupervised machine-learning processes and/or models as described above; such models may include without limitation a training data classifier 216. Training data classifier 216 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to identify entity profiles where, based on historical performance assessments within the entity model, standard users would classify the entity as a high performer within their standard role. As applicable to this disclosure, machine-learning module 200 may distribute such high performing entities widely across the portfolios of engagement models to prevent isolating all high performers within a single engagement. With the purpose of the system to optimize a model of models, this type of distribution may be shown to improve a user objective of maximizing cost-effective engagement execution.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, and outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine-learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 232. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 232 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 232 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 232 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
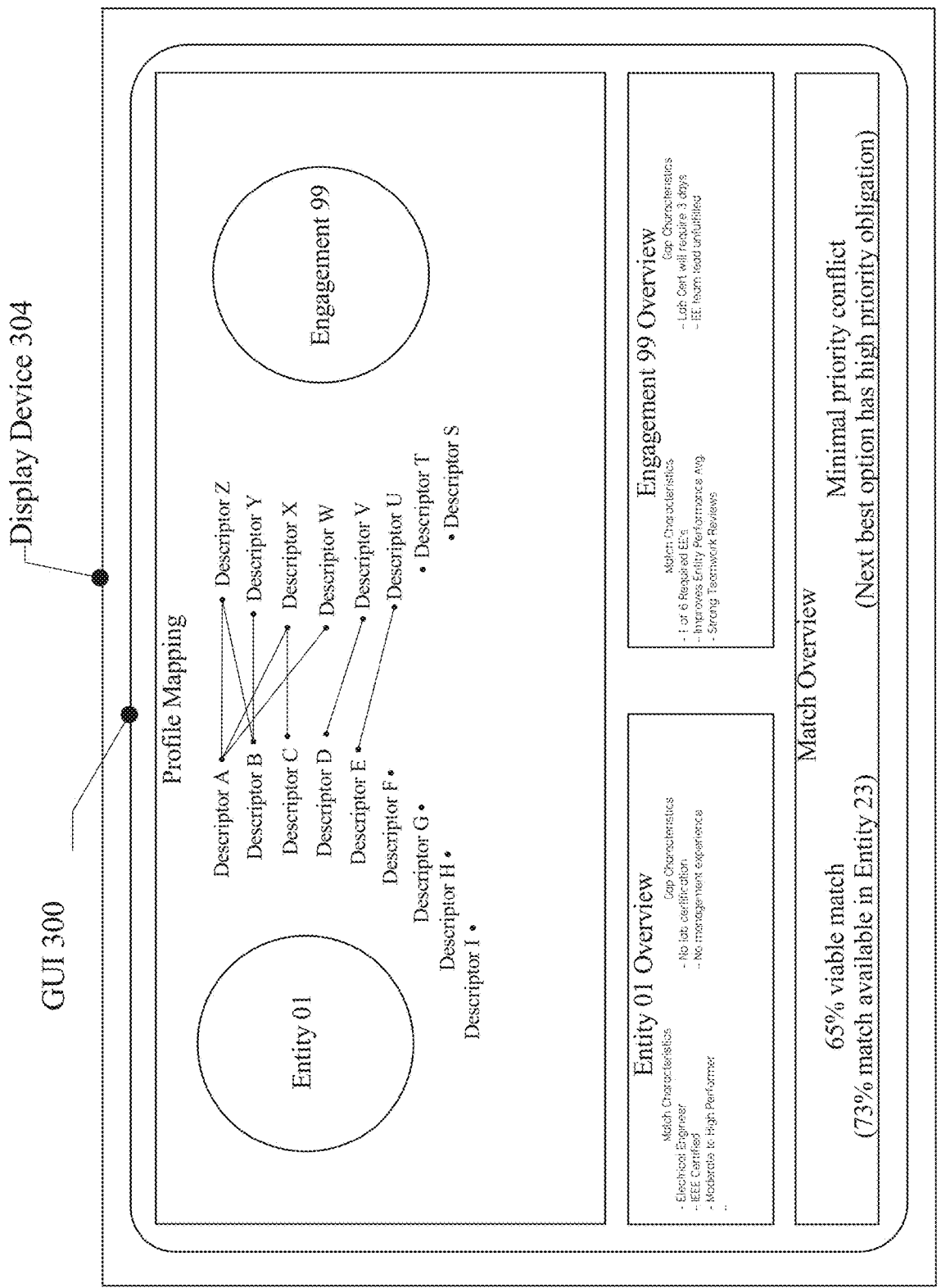
FIG. 3 is an illustrative embodiment of a user interface.

Referring now to FIG. 3, an exemplary embodiment of a GUI 300 is illustrated. GUI 300 is configured to receive the entity and engagement profiles as discussed above and display any data described in this disclosure. GUI may include, but is not limited to, a smartphone, tablet, laptop, monitor, tablet, and the like. Display device 304 may further include a separate device that includes a transparent screen configured to display computer generated images and/or information. In some cases, GUI 300 may be displayed on a plurality of display devices. In some cases, GUI 300 may display data on separate windows. A user may navigate through different windows wherein each window may contain new or differing information or data. A user may navigate through a first second, third and fourth window (and so on) by interacting with GUI 300. For example, a user may select a button or a box signifying a next window on GUI, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various wherein each window may request or display information to or form a user. In this instance, window displays an identification field wherein the identification field signifies to a user, the particular action/computing that will be performed by a computing device. GUI 300 may be configured to display multiple entity profiles, or multiple engagement profiles. GUI 300 may be configured to summarize the displayed profiles using the allocated descriptors or descriptor classifiers as described above. GUI 300 may further be configured to display a match and/or gap overview, wherein a match and gap overview captures and summarizes the alignment and missing components, respectively, of the cluster pair.

With continued reference to FIG. 3, GUI 300 may be configured to receive user feedback. For example, GUI may be configured to allow the user to provide feedback on the allocated descriptors, match ratings, or recommendations. Feedback may be limited to a binary or abbreviated format such that it is easily interpreted to a machine-readable version and implementable within the machine-learning training data. In some cases, user feedback may be used to train a machine-learning model as described above. In a non-limiting embodiment, GUI 300 may allow user to adjust the layout and display according to user preferences.

Still referring to FIG. 3, GUI 300 may include a plurality of event handlers. As used in this disclosure, an "event handler graphic" is a graphical element with which a user of remote device may interact to enter data, for instance and without limitation for a search query or the like as described in further detail below. An event handler graphic may include, without limitation, a button, a link, a checkbox, a text entry box and/or window, a drop-down list, a slider, or any other event handler graphic that may occur to a person skilled in the art upon reviewing the entirety of this disclosure. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device to apparatus. In some embodiments, event handler may be associated with a service identifier. As used in this disclosure, a "service identifier" is a graphical indication of a service accessible based on a user's access. In some embodiments, a portion of service identifiers may be selectively available to users of particular membership tier.

In an embodiment, and continuing to refer to FIG. 3, event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on computing device 104; for instance, data may be saved wholly or in part as a "cookie" which may include data or an identification of remote device to prompt provision of cross-session state variable by apparatus, which may store the data on apparatus. Alternatively, or additionally, apparatus may use login credentials, device identifier, and/or device fingerprint data to retrieve cross-session state variable, which apparatus may transmit to remote device. Cross-session state variable may include at least a prior session datum. A "prior session datum" may include any element of data that may be stored in a cross-session state variable. Event handler graphic may be further configured to display the at least a prior session datum, for instance and without limitation auto-populating user query data from previous sessions.

Figure 4:
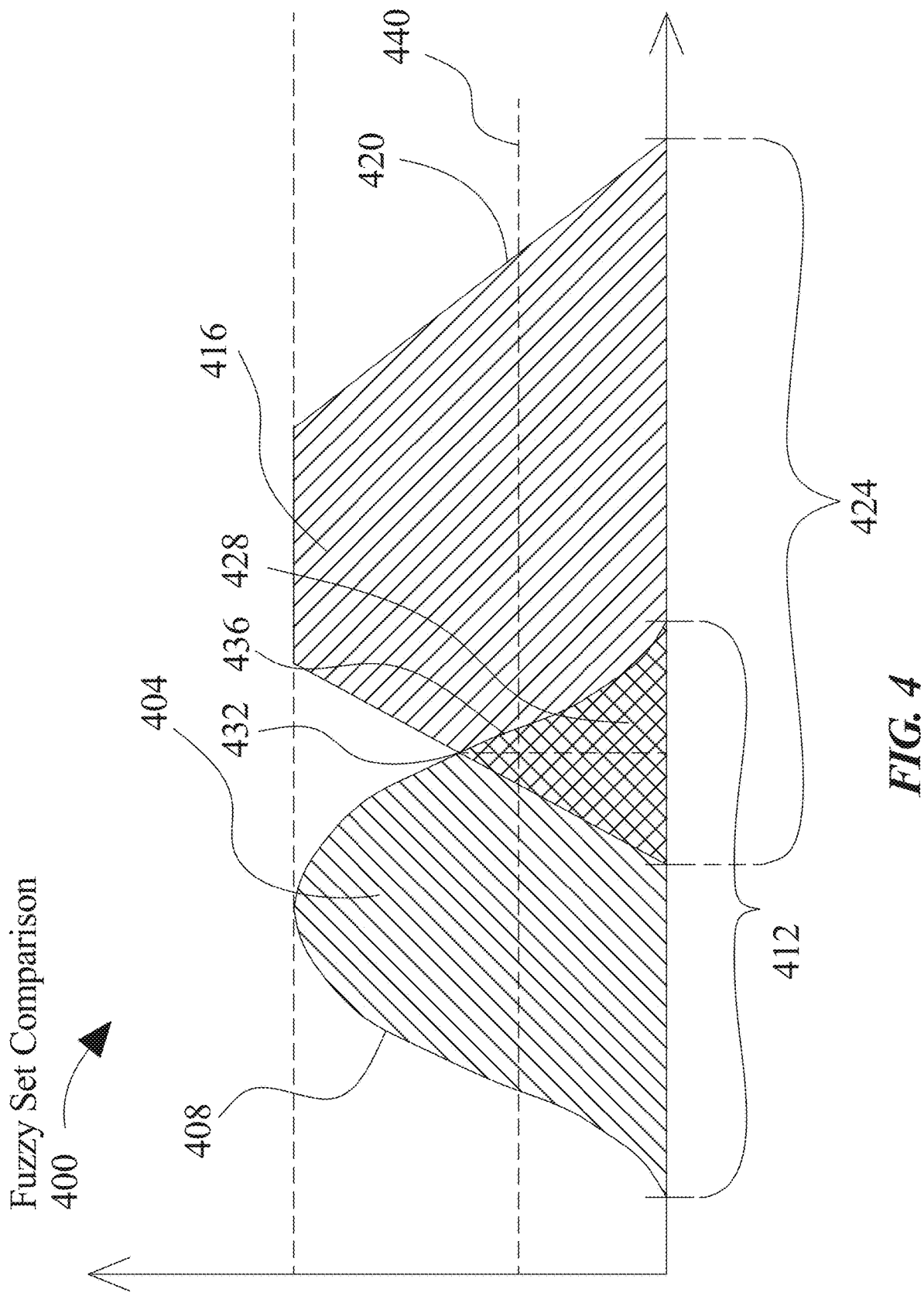
FIG. 4 is an exemplary embodiment of a fuzzy set comparison.

Referring now to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \dfrac{x-a}{b-a}, & \text{for } a \leq x < b \\ \dfrac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 4, first fuzzy set 404 may represent any value or combination of values as described above, including output from one or more machine-learning models, entity profile, or engagement profile. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between an output from one or more machine-learning models and/or profiles, such as without limitation descriptors categorization, for combination to occur as described above. Alternatively or additionally, each threshold may be tuned by a machine-learning and/or statistical process, for instance and without limitation as described in further detail above.

Further referring to FIG. 4, in an embodiment, a degree of match between fuzzy sets may be used to classify an entity or engagement profile cluster with descriptors. For instance, if a descriptor has a fuzzy set matching entity profile cluster fuzzy set by having a degree of overlap exceeding a threshold, processor may classify the entity profile cluster as belonging to the descriptors categorization. Where multiple fuzzy matches are performed, degrees of match for each respective fuzzy set may be computed and aggregated through, for instance, addition, averaging, or the like, to determine an overall degree of match.

Still referring to FIG. 4, in an embodiment, an entity profile cluster may be compared to multiple descriptors categorization fuzzy sets. For instance, entity profile cluster may be represented by a fuzzy set that is compared to each of the multiple descriptors categorization fuzzy sets; and a degree of overlap exceeding a threshold between the entity attribute cluster fuzzy set and any of the multiple descriptors categorization fuzzy sets may cause processor to classify the entity attribute cluster as belonging to descriptors categorization. For instance, in one embodiment there may be two descriptors categorization fuzzy sets, representing respectively descriptors categorization and a descriptors categorization. Entity descriptors categorization may have an entity fuzzy set; Engagement descriptors categorization may have a second fuzzy set; and entity-engagement profile cluster pairs may have a paired cluster fuzzy set. Machine-learning methods as described throughout may, in a non-limiting example, generate coefficients used in fuzzy set equations as described above, such as without limitation x, c, and σ of a Gaussian set as described above, as outputs of machine-learning methods.

Still referring to FIG. 4, compatibility of entity models and engagement models may be assessed and allocated based on fuzzy sets. In a non-limiting embodiment, descriptors assigned to entity model may be represented by first range fuzzy set 412, while descriptors assigned to engagement model may be represented by second range fuzzy set 424, wherein the greater probability 428 is the better match and more appropriate that specific allocation is. Upon repeating this fuzzy set comparison for all entity and engagement models, apparatus may rank or prioritize each pair to enable comprehensive optimization of all entities and engagements simultaneously.

Still referring to FIG. 4, a computing device may use a logic comparison program, such as, but not limited to, a fuzzy logic model to determine a descriptor's response. A descriptor's response may include, but is not limited to, creator, implementor, or repeater, as described above; each such descriptor response may be represented as a value for a linguistic variable representing descriptors response or in other words a fuzzy set as described above that corresponds to a degree of compatibility as calculated using any statistical, machine-learning, or other method that may occur to a person skilled in the art upon reviewing the entirety of this disclosure. In other words, a given element of a profile may have a first non-zero value for membership in a first linguistic variable value such as first score label and a second non-zero value for membership in a second linguistic variable value such as second score label. In some embodiments, determining a descriptor's categorization may include using a linear regression model. A linear regression model may include a machine-learning model. A linear regression model may be configured to map data of first profile cluster, such as quantity of related historical data to one or more descriptor parameters. A linear regression model may be trained using a machine-learning process. In some embodiments, determining a descriptor of entity profile cluster may include using a descriptor classification model. A descriptor classification model may be configured to input collected data and cluster data to a category based on, but not limited to, frequency of appearance, linguistic indicators of quality, and the like. Categories may include scores assigned to them such that profile may each be assigned a score based on a plurality of attributes. In some embodiments descriptor classification model may include a K-means clustering model. In some embodiments, descriptor classification model may include a particle swarm optimization model. In some embodiments, determining the descriptors of a profile cluster may include using a fuzzy inference engine. A fuzzy inference engine may be configured to map one or more first attribute cluster data elements using fuzzy logic. In some embodiments, entity-engagement profile cluster may be arranged by a logic comparison program into a descriptors arrangement. A "descriptors arrangement," as used in this disclosure, is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a category corresponding to a given linguistic score level, and an iterative or other method may be used to find a membership function, for any membership function type as described above, that minimizes an average error from the statistically determined distribution, such that, for instance, a triangular or Gaussian membership function about a category representing a center of the distribution that most closely matches the distribution. Error functions to be minimized, and/or methods of minimization, may be performed without limitation according to any error function and/or error function minimization process and/or method as described in this disclosure.

Further referring to FIG. 4, an inference engine may be implemented according to input and/or output membership functions and/or linguistic variables. For instance, a first linguistic variable may represent a first measurable value pertaining to first profile cluster, such as a degree of compatibility of an element, while a second membership function may indicate a degree of descriptor applicability of a subject thereof, or another measurable value pertaining to first profile cluster. Continuing the example, an output linguistic variable may represent, without limitation, a score value. An inference engine may combine rules, such as: "if the compatibility level is 'high' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally, T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 5:
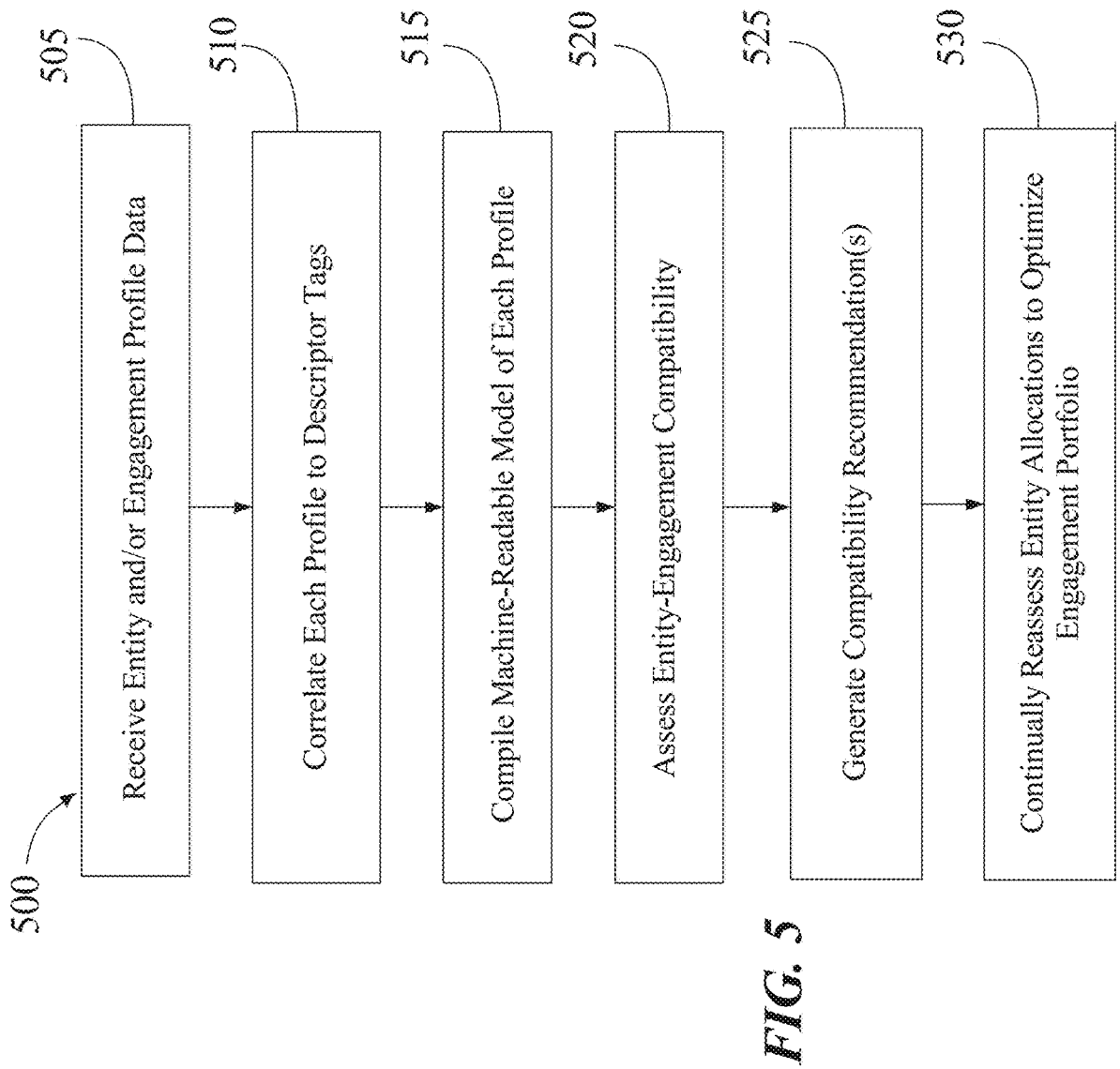
FIG. 5 is a flow diagram of an exemplary method for meta-model optimization.

Referring now to FIG. 5, an exemplary method 500 for meta-model optimization for an entity-engagement cluster pairing. Method 500 includes a step 505, receiving, by the computing device, an entity profile and/or an engagement profile. In some embodiments, receiving the entity and/or engagement profile comprises receiving a plurality of entity and/or engagement profiles through a GUI, other user interface, or a data repository. This may occur as described above in reference to FIGS. 1-6.

With continued reference to FIG. 5, method 500 includes a step 510 of correlating, by the computing device, each entity and engagement profile to a plurality of descriptors. Correlation, as described above, may involve key words or combinations of words to identify a unique or valuable characteristic in support of pairing entity profiles to engagement profiles. This may occur as described above in reference to FIGS. 1-6.

With continued reference to FIG. 5, method 500 includes a step 515 of compiling, by the computing device, a machine-readable model of each profile. This may occur as described above in reference to FIGS. 1-6.

With continued reference to FIG. 5, method 500 includes a step 520 of assessing, by the computing device, the entity-engagement compatibility. In a non-limiting embodiment, step 520 may readily identify a compatible match, or may require significant screening and input, dependent on a user-defined threshold for a compatibility harmonizer. This may occur as described above in reference to FIGS. 1-6.

With continued reference to FIG. 5, method 500 includes at step 525 of generating, by the computing device, a plurality of compatibility recommendations. In a non-limiting embodiment, step 525 may generate a single best fit match. In a separate, non-limiting embodiment, step 525 may generate a list of matches ranked or organized by a compatibility score. This may occur as described above in reference to FIGS. 1-6.

With continued reference to FIG. 5, method 500 includes a step 530 of continually reassessing, by the computing device, the entity allocations such that the user engagement portfolio is optimally executed. In a non-limiting embodiment, the optimal allocations may be based on maximal efficiency, minimal cost, maximal personality compatibility, or application of some other user-defined objective. This may occur as described above in reference to FIGS. 1-6.

It is to be noted that any one or more of the aspects and embodiments described herein may be conveniently implemented using one or more machines (e.g., one or more apparatus s that are utilized as a user apparatus for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g. a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
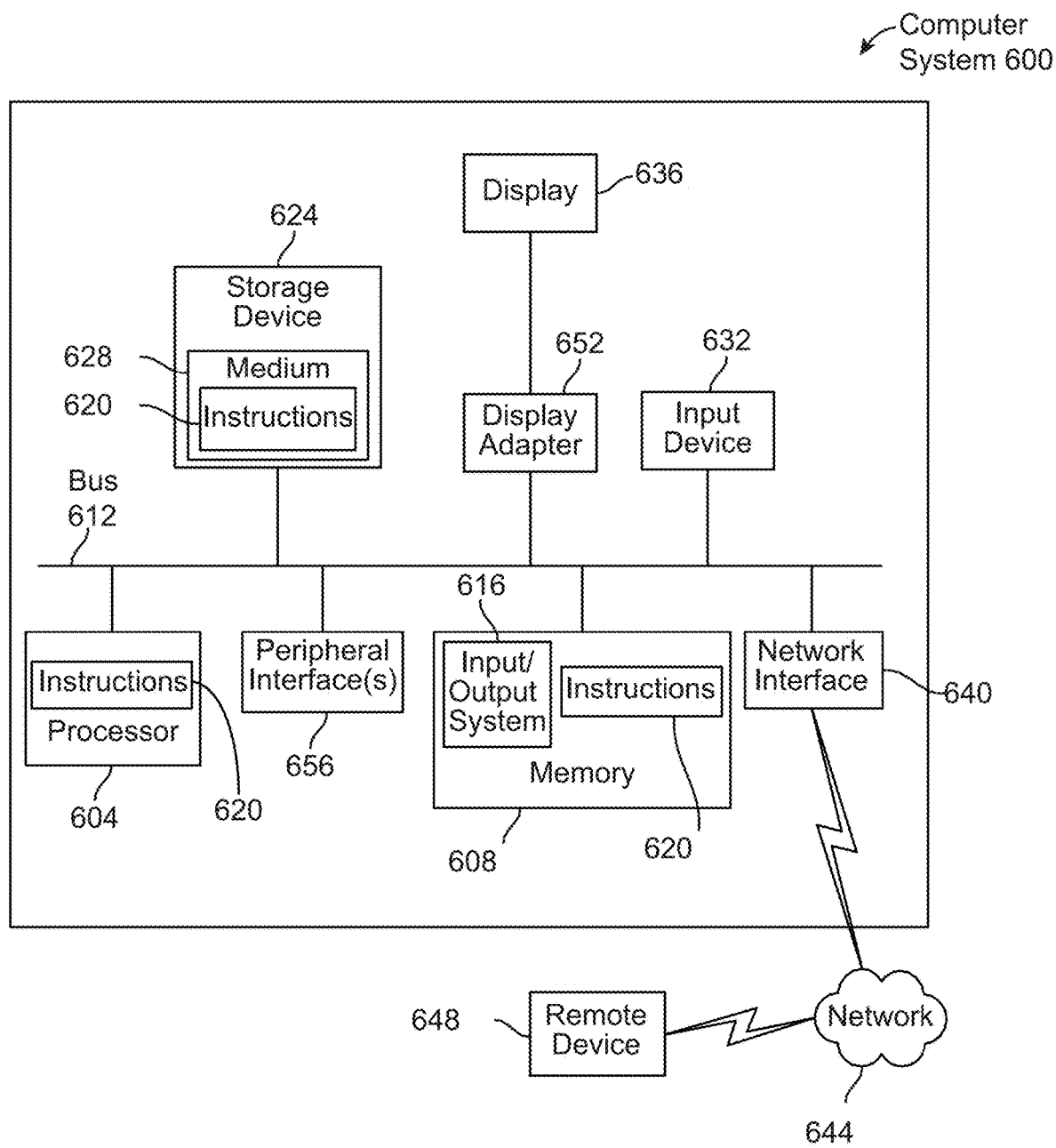
FIG. 6 is a block diagram of a computer device that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 800 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for meta-model optimization, wherein the apparatus comprises:
   a computing device comprising a physical processor communicatively connected to a memory, wherein the physical processor is configured to:
   receive a plurality of entity profile data of a plurality of entity profiles and a plurality of engagement profile data of a plurality of engagement profiles from a user;
   classify each entity profile and each engagement profile to a plurality of descriptors, wherein classifying each entity profile and each engagement profile comprises:
     receiving training data, wherein the training data includes historical user inputs and assigned descriptors; and
     training a machine-learning model as a function of the training data;
   identify an optimal compatibility allocation of entities to engagements, wherein the optimal compatibility allocation is determined using a cluster pairing approach matching entity profile data to engagement profile data using a clustering algorithm relying on profile descriptor allocations and employing a k-means clustering algorithm;
   generate a user display summarizing the optimal compatibility allocation; and
   reassess entity allocations to continually optimize a user engagement portfolio.

2. The apparatus of claim 1, wherein receiving the plurality of entity profile data and the plurality of engagement profile data from the user comprises receiving the plurality of entity profile data and the plurality of engagement profile data from a graphical user interface.

3. The apparatus of claim 1, wherein receiving the plurality of entity profile data and the plurality of engagement profile data from the user comprises receiving the plurality of entity profile data and the plurality of engagement profile data from a data repository.

4. The apparatus of claim 1, wherein at least one entity profile data uses a set of proprietary or industry standard multiple-choice questions to identify the entity's most effective contribution qualities and store the entity profile data to a data repository.

5. The apparatus of claim 1, wherein classifying each entity profile and each engagement profile to the plurality of descriptors comprises correlating each entity profile and each engagement profile to the plurality of descriptors wherein each descriptor is assigned a relative prioritization.

6. The apparatus of claim 1, wherein classifying each entity profile and each engagement profile to the plurality of descriptors comprises:
   generating a descriptor classifier using the training data, wherein the training data comprises a plurality of entity profile entries and a plurality of engagement profile entries classified to a plurality of descriptor entries, which were subsequently successfully paired as assessed by the user; and
   correlating the plurality of entity profile data and engagement profile data using the descriptor classifier.

7. The apparatus of claim 1, wherein the physical processor is further configured to compile a digital model for each entity profile and each engagement profile, wherein compiling the digital model further comprises:
   associating the plurality of entity profiles and the plurality of engagement profiles to affiliated descriptors;
   incorporating an affiliated relative prioritization of any related descriptor into the associated entity or engagement profile;
   integrating any historical data available for the associated entity or engagement profile into the digital model; and
   categorizing each profile based on any statistically significant characteristics as determined by a machine-learning model.

8. The apparatus of claim 1, wherein identifying the optimal compatibility allocation of entities to engagements comprises:
   accepting user-defined priorities for each engagement;
   training a machine-learning model as a function of an optimal allocation of resources;
   constructing a compatibility profile for each potential entity-engagement pair which evaluates an availability and a priority of each engagement profile with regard to a likelihood of engagement success; and
   calculating an optimal allocation of entities across all known engagements to optimize execution based on user-defined priorities.

9. The apparatus of claim 8, wherein calculating the optimal allocation of entities across all known engagements comprises:
   isolating mandatory attribute requirements;
   isolating unique features of each entity model of a plurality of entity models and its assigned descriptors from all entity models and matching a best fit entity model with the needs of each engagement;

comparing all possible allocations and ranking them based on optimization of all user engagements; and filtering all of the possible allocations based on a set of user refinement criteria.

10. The apparatus of claim 8, wherein calculating the optimal allocation of entities across all known engagements involves calculating the optimal allocation as a function of the machine-learning model.

11. A method for meta-model optimization, the method comprising;

receiving, by a computing device, a plurality of entity profile data of a plurality of entity profiles and a plurality of engagement profile data of a plurality of engagement profiles;

correlating, by the computing device, each entity and each engagement profile to a plurality of descriptors;

compiling, by the computing device, a digital model for each entity and engagement profile;

identifying, by the computing device, an optimal compatibility allocation of entities to engagements based on a cluster pairing process as adapted by machine-learning;

generating, by the computing device, a user display summarizing the optimal compatibility allocation data; and reassessing each entity allocation for any new user inputs or changes over time.

12. The method of claim 11, wherein receiving, by the computing device, the plurality of entity profile data and the plurality of engagement profile data comprises receiving, by a graphical user interface communicatively connected to the computing device, the plurality of entity profile data and the plurality of engagement profile data.

13. The method of claim 11, wherein receiving, by the computing device, the plurality of entity profile data and the plurality of engagement profile data comprises receiving, by a data repository communicatively connected to the computing device, the plurality of entity profile data and the plurality of engagement profile data.

14. The method of claim 11, wherein receiving, by the computing device, at least one entity profile data, the computing device uses a set of proprietary or industry standard multiple-choice questions to identify the entity's most effective contribution qualities and store the entity profile data to a data repository.

15. The method of claim 11, wherein correlating, by the computing device, the plurality of entity profile data and the plurality of engagement profile data from the user includes assigning a relative prioritization to each descriptor of the one or more descriptors.

16. The method of claim 11, wherein correlating, by the computing device, each entity profile and engagement profile to the plurality of descriptors comprises:

generating, by the computing device, a descriptor classifier using the training data, wherein the training data comprises a plurality of entity profile entries and a plurality of engagement profile entries classified to a plurality of descriptor entries;

and correlating, by the computing device, the plurality of entity profile data and engagement profile data using the descriptor classifier.

17. The method of claim 11, wherein compiling, by the computing device, the digital model for each entity and engagement profile comprises:

associating the plurality of entity and the plurality of engagement profiles to affiliated descriptors;

incorporating an affiliated relative prioritization of any related descriptor into the associated entity or engagement profile;

integrating any historical data available for the associated entity or engagement profile into the digital model; and categorizing each profile based on any statistically significant characteristics as determined by a machine-learning model.

18. The method of claim 11, wherein identifying, by the computing device, the optimal compatibility allocation of entities to engagements comprises:

incorporating the relative prioritization of each descriptor of the plurality of descriptors;

training a machine-learning model as a function of an optimal allocation of resources;

constructing a digital model for each correlated entity profile and each correlated engagement profile; and calculating the optimal allocation of entities across all known engagements.

19. The method of claim 18, wherein calculating, by the computing device, the optimal allocation of entities across all known engagements comprises:

isolating mandatory attribute requirements;

isolating unique features of each entity model and its descriptors from all entity models and matching a best fit entity model of a plurality of models with the needs of each engagement;

comparing all possible allocations and ranking them based on optimization of all engagement qualifiers; and filtering all of the possible allocations based on a set of user refinement criteria.

20. The method of claim 18, wherein calculating the optimal allocation of entities across all known engagements involves calculating the optimal allocation as a function of the machine-learning model.

* * * * *